(12) United States Patent
Hundley, III et al.

(10) Patent No.: US 11,326,682 B2
(45) Date of Patent: May 10, 2022

(54) TOOTHED BELT INSTALLATION TOOL

(71) Applicant: United States Postal Service, Washington, DC (US)

(72) Inventors: Robert Lyell Hundley, III, Fairfax, VA (US); Terry Martin Gingell, Spotsylvania, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 17/308,387

(22) Filed: May 5, 2021

(65) Prior Publication Data

US 2021/0348680 A1 Nov. 11, 2021

Related U.S. Application Data

(60) Provisional application No. 63/021,489, filed on May 7, 2020.

(51) Int. Cl.
*F16H 57/00* (2012.01)

(52) U.S. Cl.
CPC ..... *F16H 57/00* (2013.01); *F16H 2057/0062* (2013.01)

(58) Field of Classification Search
CPC ................. B25B 9/00; Y10T 29/53978; Y10T 29/49464; Y10T 29/49465; Y10T 29/53913; Y10T 29/4978; Y10T 29/49826; Y10T 29/49895; Y10T 29/49998; Y10T 29/53943; Y10T 29/53961; Y10T 29/53991
USPC ........................................................ 29/893.1
See application file for complete search history.

(56) References Cited

U.S. PATENT DOCUMENTS 9,850,991 B2 * 12/2017 Reinhart ................... F16H 7/24

* cited by examiner

*Primary Examiner* — Jason L Vaughan
*Assistant Examiner* — Amanda Kreiling
(74) *Attorney, Agent, or Firm* — Knobbe, Martens, Olson & Bear, LLP

(57) ABSTRACT

Installation devices, systems, methods of use, and methods of manufacture are described. An installation device that facilitates installing a toothed belt on a sprocket within a housing.

20 Claims, 12 Drawing Sheets

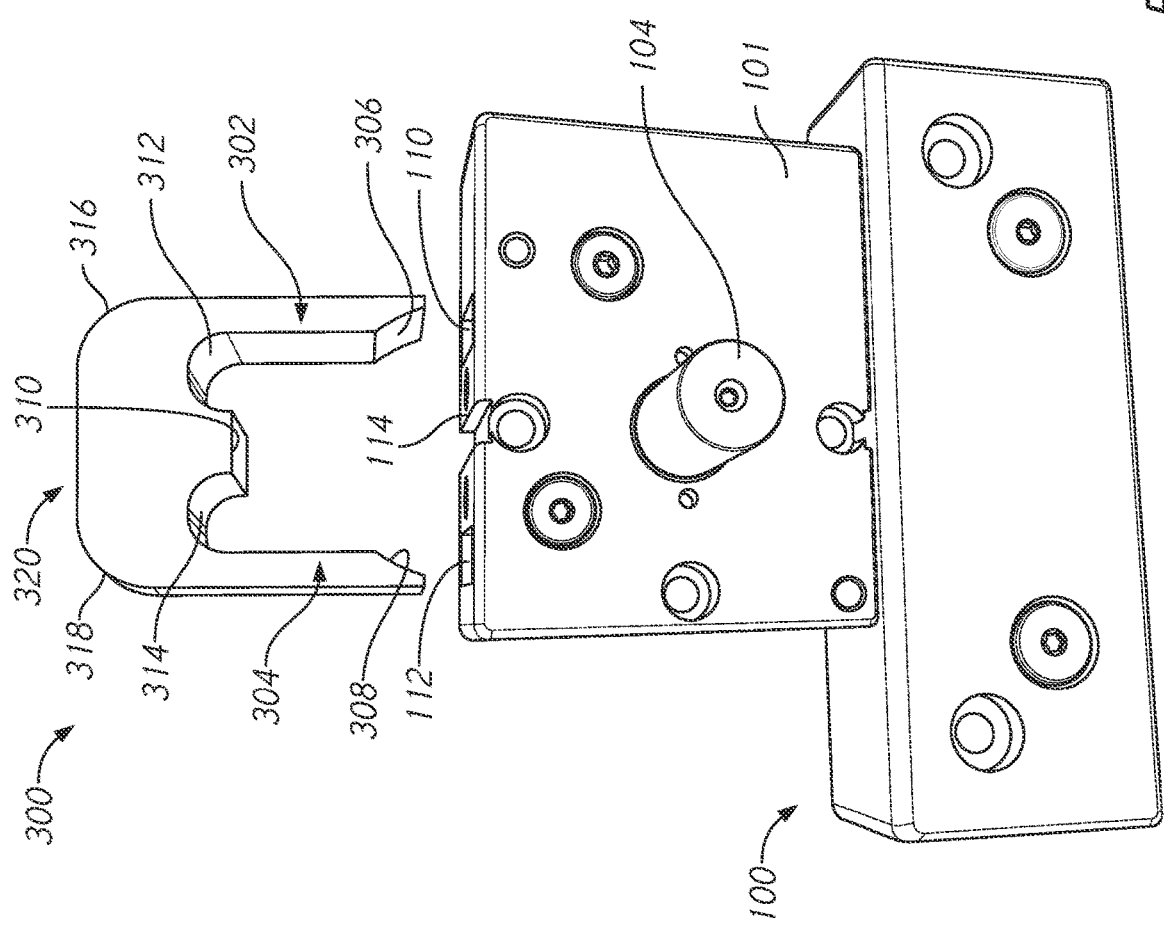

TOOTHED BELT INSTALLATION TOOL

INCORPORATION BY REFERENCE

This application claims the benefit of priority to U.S. provisional application 63/021,489, filed May 7, 2020, the entire contents of which is hereby incorporated by reference. Any and all applications for which a foreign or domestic priority claim is identified in the Application Data Sheet as filed with the present application are hereby incorporated by reference under 37 C.F.R. § 1.57.

BACKGROUND

This disclosure relates to belt installation devices, systems, methods of use, and methods of manufacture. In particular, this disclosure relates to toothed belt installation tools for installing a toothed belt.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include quickly installing toothed belts.

In some aspects, an installation tool for installing a toothed belt is disclosed herein. The installation tool can include a main body. The installation tool can include a first arm extending away from the main body. The first arm can include a first engagement surface. The installation tool can include a second arm extending away from the main body. The second arm can include a second engagement surface. The installation tool can include a stop positioned between the first and second arms. The first arm can be inserted into a first opening of a housing. The second arm can be inserted into a second opening of a housing. The stop can contact a surface of the housing to stop advancement of the first arm within the first opening and the second arm within the second opening such that the first engagement surface and second engagement surface can be positioned at depths within the first opening and second opening to guide a toothed belt inserted into the housing.

In some aspects, the first and second engagement surfaces can be curved.

In some aspects, the first engagement surface and the second engagement surface face each other.

In some aspects, the first and second arms can be positioned at depths within the first and second openings to prevent a toothed belt inserted into the housing from extending into the first or second opening.

In some aspects, the installation tool can include a first contoured portion extending between the first arm and the stop and a second contoured portion extending between the second arm and the stop.

In some aspects, the first contoured portion and second contoured portion each can include two opposing curves.

In some aspects, the first arm and second arm can be on opposing sides of the main body.

In some aspects, the first engagement surface and/or second engagement surface can be shaped to direct the toothed belt toward a sprocket within the housing during installation of the toothed belt.

In some aspects, the first engagement surface can be disposed on an inside surface of the first arm and the second engagement surface can be disposed on an inside surface of the second arm.

In some aspects, the first engagement surface can be disposed at an end portion of the first arm and the second engagement surface can be disposed at an end portion of the second arm.

In some aspects, the first arm further can include a flat end and the second arm can include a flat end.

In some aspects, the installation tool can be made of aluminum.

In some aspects, an installation tool for installing a toothed belt is disclosed herein. The installation tool can include a grasping portion. The installation tool can include a first arm extending away from the grasping portion. The first arm can include a first curved surface. The installation tool can include a second arm extending away from the grasping portion. The second arm can include a second curved surface. The installation tool can include a stop positioned between the first and second arms. The first arm can be inserted into a first opening of a housing and the second arm can be inserted into a second opening of the housing. The stop can contact the housing to position the first arm into the first opening and the second arm into the second opening at depths such that the first curved surface and second curved surface are radially offset from a sprocket housed within the housing. The first curved surface and/or second curved surface can guide an end of a toothed belt inserted into the housing for installation around the sprocket.

In some aspects, the first and second curved surfaces can impede the toothed belt from being inserted into the first opening and second opening.

In some aspects, the first arm can be in a mirrored configuration relative to the second arm.

In some aspects, the stop can be disposed between the first arm and the second arm.

In some aspects, the first engagement surface can be disposed at an end portion of the first arm and the second engagement surface can be disposed at an end portion of the second arm.

In some aspects, a method of installing a toothed belt on a sprocket within a housing is disclosed herein. The method can include aligning a first arm of an insertion tool with a first opening of a housing. The method can include aligning a second arm of an insertion tool with a second opening of the housing. The method can include advancing the first arm into the first opening and second arm into the second opening until a stop of the insertion tool contacts the housing to prevent further advancement such that a first engagement surface of the first arm blocks access to the first opening from within the housing and a second engagement surface of the second arm blocks access to the second opening from within the housing. The method can include advancing an end of a toothed belt into a first channel of the housing. The method can include rotating a sprocket disposed within the housing until the sprocket engages and drives the toothed belt through the housing and out a second channel of the housing.

In some aspects, the method can include deflecting the end of the toothed belt off the first engagement surface and toward the sprocket.

In some aspects, the method can include orienting a center longitudinal axis of the first arm to be coaxial with a center axis of the first opening and orienting a center longitudinal axis of the second arm to be coaxial with a center axis of the second opening.

BRIEF DESCRIPTION OF THE DRAWINGS

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

FIG. 5A illustrates the housing with a cover and the installation tool being inserted therein.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

The quantity of items, such as packages and parcels, being delivered to homes and businesses is rising. Often large quantities of items need to be processed quickly and efficiently. Consequently, distribution networks, such as the United States Postal Service (USPS), employ processing equipment, such as automatic item feeders, sorters, conveyors, and the like, to quickly process large quantities of items. Such processing equipment can include motor(s) that rotate a sprocket or gear to drive a toothed belt (e.g., timing belt). During normal use, timing belts are periodically replaced due to wear (e.g., every 10-12 months). Replacing a timing belt can be a labor and time intensive process that prevents the processing equipment from processing items for an extended period of time, hindering the fast and efficient processing of items. Accordingly, distribution networks can use installation tools described herein to quickly install a new timing belt to reduce down time of the processing equipment, which can improve processing efficiency.

Figure 1:
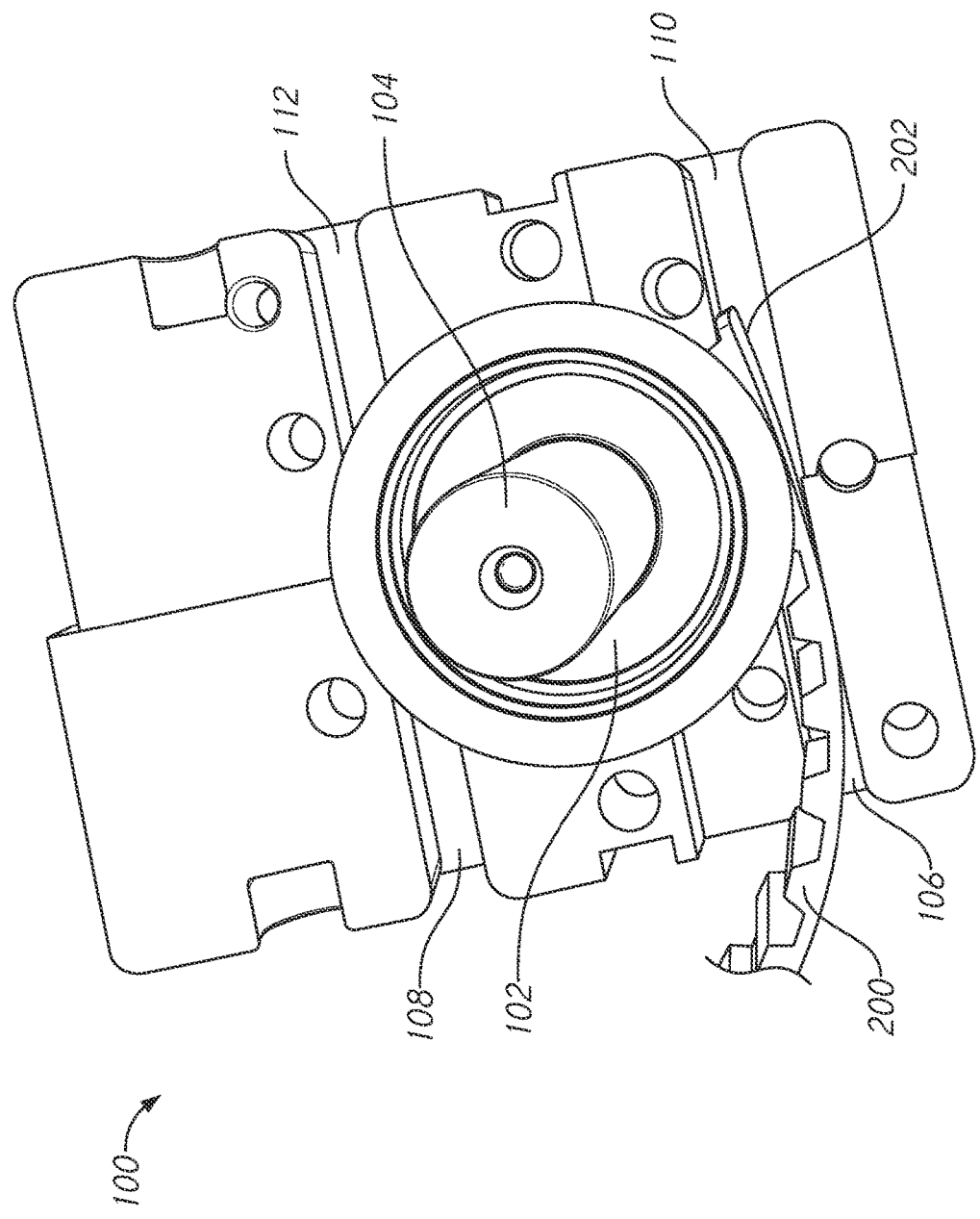
FIG. 1 illustrates an exemplary housing with a toothed belt improperly installed.

FIG. 1 illustrates a toothed belt (timing belt, cogged belt, belt) 200 being improperly installed. Although described and depicted as a toothed belt, a non-toothed belt or other kind of belt can be used without departing from the scope of this disclosure. An example housing (sprocket housing, cog block housing) 100 is shown with a cover removed to show a portion of a sprocket (cog, gear, pinion) 102 located therein. The housing 100 illustrated is exemplary and is manufactured by Macron Dynamics, Inc. The sprocket 102 is coupled to a shaft 104 that, when rotated, causes the sprocket 102 to rotate. The shaft 104 can extend out of the housing 100 to be rotated via a motor (e.g., electric motor, step motor). When properly installed, the toothed belt 200 is inserted through a first channel (passage, opening, conduit, inlet) 106 of the housing 100, extends around teeth of the sprocket 102, and exits the housing 100 via a second channel (passage, opening, conduit, outlet) 108. The rotation of the shaft 104 via the motor rotates the sprocket 102 which, in turn, drives the toothed belt 200 to operate processing equipment or portions of processing equipment.

It can be difficult to insert and guide the toothed belt 200 for proper installation, as described above. For example, the end 202 of the toothed belt 200 can inadvertently extend into a first opening (passage, channel, conduit, inlet) 110 or second opening (passage, channel, conduit, inlet) 112 to impede proper installation. As illustrated in FIG. 1, the end 202 of the toothed belt 200 is extending into the first opening 110, rather than extending around the sprocket 102 and out the second channel 108 for proper installation. Users have found that installing a toothed belt 200 without a proper tool, such as described herein, can be frustrating, damage the replacement belt, and be time consuming. For example, properly installing a timing belt 200 without the tools described herein can take twenty minutes or more. This leads to significant time lost in utilizing the processing equipment, and can affect an entire processing facility's sort plan and efficient operation.

Figure 2A:
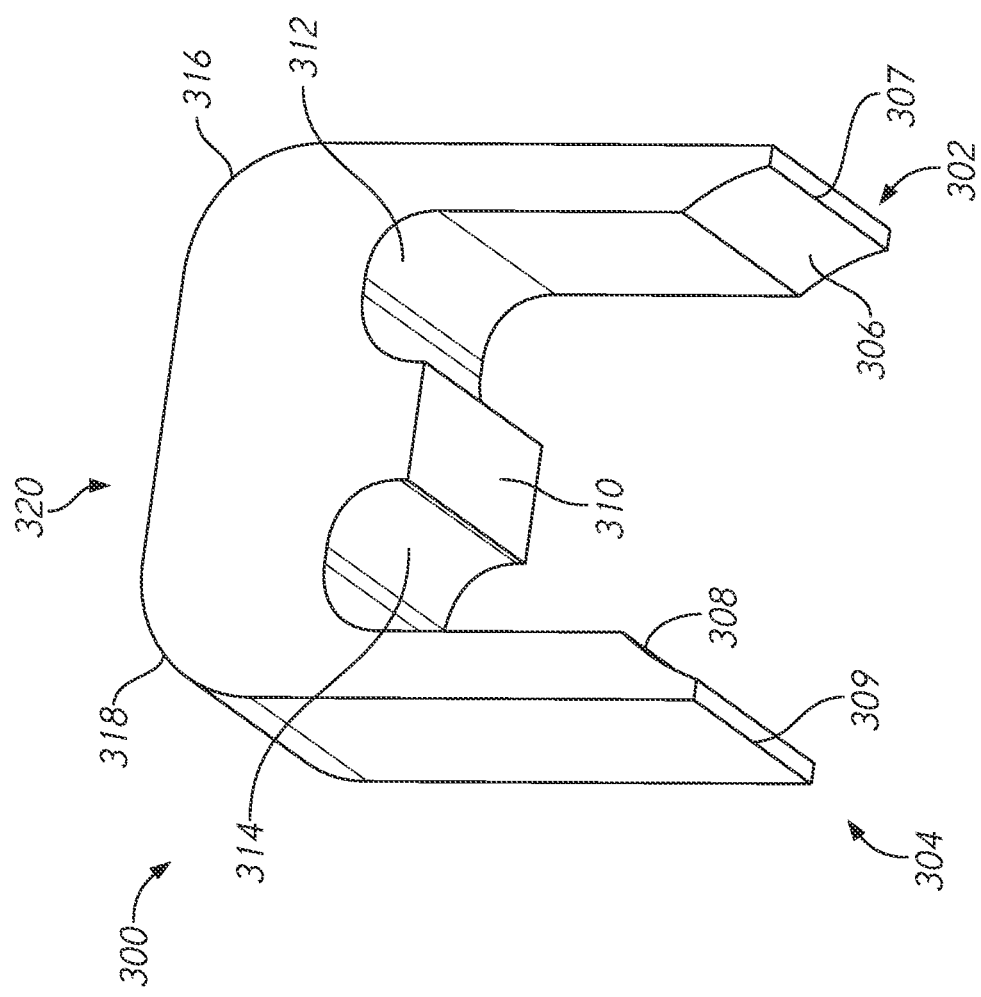
FIG. 2A illustrates an exemplary installation tool.
Figure 2B:
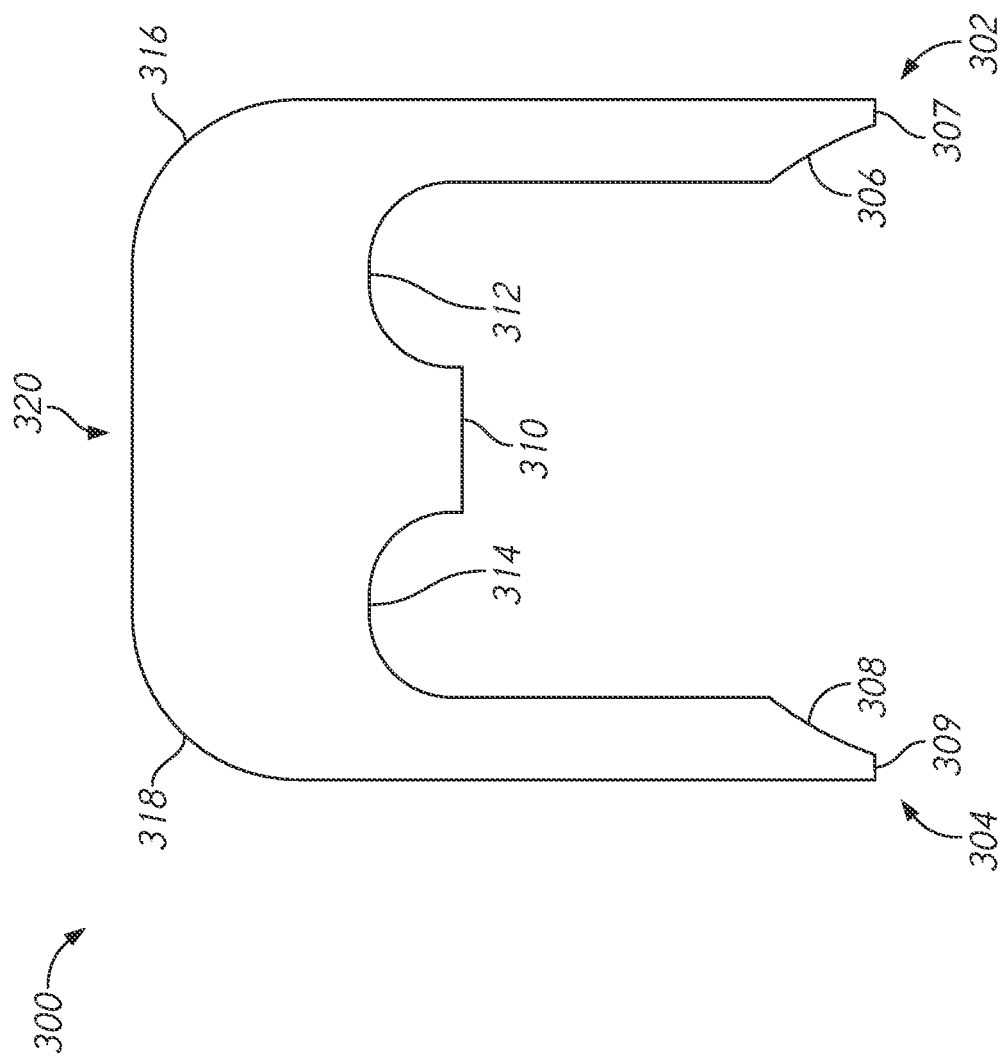
FIG. 2B illustrates another view of the installation tool of FIG. 2A.

FIGS. 2A and 2B illustrate various views of an installation tool (toothed belt installation tool, timing belt installation tool, pronged tool, forked tool) 300 that can be used to efficiently and properly install the toothed belt 200. The installation tool 300 includes a first arm (member, prong, branch) 302 and a second arm (member, prong, branch) 304. The first arm 302 is configured to be inserted into the first opening 110 of the housing 100. The second arm 304 is configured to be inserted into the second opening 112 of the housing 100. The first arm 302 and second arm 304 are depicted in mirrored configurations, which can enable the first arm 304 to be inserted into the second opening 112 and the second arm 304 to be inserted into the first opening 110. In some embodiments, however, the first arm 302 and second arm 304 can be in other configurations according to the arrangement of openings in the sprocket housing 100.

The first arm 302 and second arm 304 extend away from a main body (grasping portion, handle portion) 320 that can be grasped by the user. The first arm 302 and second arm 304 extend away from the main body 320 in the same direction. The first arm 302 and second arm 304 equidistantly extend away from the main body 320, and can extend from opposite ends of the main body 320. In some embodiments, the first arm 302 and second arm 304 extend different distances away from the main body 320 and/or in different directions, according to the arrangement of the housing 100 with which the tool 300 is to be used. The first arm 302 and second arm 304 can be elongate. The first arm 302 and second arm 304 can each have a rectangular cross-section. The first arm 302 and second arm 304 can each have cross-sections that are different shapes such as polygonal, irregular, and/or others. The first arm 302 and second arm 304 can have cross-sections that substantially fill the first opening 110 and second opening 112, respectively, while allowing the first arm 302 and second arm 304 to be easily inserted into and/or removed from therein. The first arm 302 and second arm 304 can be positioned on opposing sides of the installation tool 300.

The first arm 302 includes a first engagement surface (interfacing surface, curved surface, angled surface) 306. The second arm 304 includes a second engagement surface (interfacing surface, curved surface, angled surface) 308. The first engagement surface 306 and second engagement surface 308 can guide the toothed belt 200 through the housing 100 to extend around the sprocket 102 and out the housing 100 for proper installation. For example, the first arm 302 and the second arm 304 can be inserted into the first opening 110 and second opening 112, respectively, such that the first engagement surface 306 and second engagement surface 308 respectively impede the end 202 of the toothed belt 200 from entering therein.

The first and second engagement surfaces 306, 308 can have a arcuate or curved surface. The arcuate or curved surfaces can mirror or correspond to a curvature or arc of the sprocket 102, and/or an inner curved surface of the housing 100. In this way, as a toothed belt 200 contacts the first engagement surface 306, the curved surface guides the toothed belt 200 in an arc within the housing 100 around the sprocket 102. The toothed belt 200 continues through the housing 100 and can then contact the second engagement surface 308. The curved surface 308 can guide or urge the toothed belt 200 along the curve or arc to move the toothed belt 200 around the sprocket 102 within the housing 100.

The first engagement surface 306 can face in the direction of the second engagement surface 308. The first engagement surface 306 can be positioned on an inside of the first arm 302. The first engagement surface 306 can be positioned on an inside or interior surface of the first arm 302. The second engagement surface 308 can be positioned on an inside or interior surface of the second arm 304. The second engagement surface 308 can be positioned on a side of the second arm 304 that is closest to the first arm 302. The first engagement surface 306 and second engagement surface 308 can be curved to guide the end 202 of the toothed belt 200 around the sprocket 102 as the user pushes the toothed belt 200 through the housing 100. In some embodiments, the first engagement surface 306 and second engagement surface 308 are angled to guide the end 202 of the toothed belt 200 around the sprocket 102 as the user pushes the toothed belt 200 through the housing 100. For example, the end 202 of the toothed belt 200 can be inserted through the first channel 106, deflect off the first engagement surface 306, extend around the sprocket 102, deflect off the second engagement surface 308, and exit the housing 100 via the second channel 108. The first engagement surface 306 and second engagement surface 308 can be radially offset from the sprocket 102. A first end 307 of the first arm 302 can be flat, which can improve user comfort upon contacting the first end 307 and can prevent the toothed belt 200 from entering the first opening 110. A second end 309 of the second arm 304 can be flat, which can improve user comfort upon contacting the second end 309. In some embodiments, the first end 307 and/or second end 309 are rounded or other shape(s).

The first engagement surface 306 can be positioned proximate the first end 307. The first engagement surface 306 can be positioned at and/or proximate the end portion of the first arm 302. The first engagement surface 306 can be positioned on an inside surface of the first arm 302. The second engagement surface 308 can be positioned proximate the second end 309. The second engagement surface 308 can be positioned at and/or proximate the end portion of the second arm 304. The second engagement surface 308 can be positioned on an inside surface of the second arm 304.

The installation tool 300 has a stop (positioning surface, stopping surface) 310. The stop 310 can engage a surface of the housing 100 to position the first arm 302 and second arm 304 at a proper or effective position within the housing 100. For example, the first arm 202 and second arm 304 can be respectively advanced through the first opening 110 and second opening 112 until the stop 310 engages the surface of the housing 100 such that the first engagement surface 306 and second engagement surface 308 are positioned to prevent the toothed belt 200 from entering the first opening 110 and second opening 112 and to be at the correct, suitable, and/or optimal position to guide the toothed belt 200 around the sprocket 102 within the housing 100. The stop 310 can be a flat surface. The stop 310 can be positioned between the first arm 302 and second arm 304. The stop 310 can extend away from the main body 320. The stop 310 can be positioned on the same side of the main body 320 as the first arm 302 and the second arm 304. In some embodiments, the stop 310, which can include one or more surfaces, is not positioned between the first arm 302 and second arm 304. The stop 310 can be equidistantly spaced from the first arm 302 and second arm 304. In some embodiments, the stop 310 is not equidistantly spaced from the first arm 302 and second arm 304. The stop 310 can be rectangular but other shapes may be used.

The installation tool 300 can include a first contoured portion (curved portion) 312. The first contoured portion 312 can be positioned between the stop 310 and the first arm 302. The first contoured portion 312 can extend between the stop 310 and the first arm 302. The installation tool 300 can include a second contoured portion (curved portion) 314. The second contoured portion 314 can be positioned between the stop 310 and the second arm 304. The second contoured portion 314 can extend between the stop 310 and the second arm 304. The first contoured portion 312 and second contoured portion 314 can be the same (e.g., size, radiuses, etc.). The first contoured portion 312 can include a flat portion between two opposing curves. The second contoured portion 314 can include a flat portion between two opposing curves. The first contoured portion 312 and second contoured portion 314 can reduce stress concentrators, which can reduce the risk that the first arm 302 and second arm 304 will break. The first contoured portion 312 and second contoured portion 314 can result from machining the installation tool 300. Curves can be easier and cheaper to form when machining. In some embodiments, a flat portion can extend between two angles in place of the first contoured portion 312. In some embodiments, a flat portion can extend between two angles in place of the second contoured portion 314.

The installation tool 300 can include a first fillet (round) 316 and/or a second fillet (round) 318. The first fillet 316 and second fillet 318 can be positioned on opposing sides of the main body 320. The first fillet 316 and second fillet 318 can reduce stress concentrators in the main body 320. The first fillet 316 and second fillet 318 can improve the user's comfort when handling the installation tool 300.

The installation tool 300 can be manufactured using a variety of manufacturing techniques, such as machining (e.g. milling), casting, additive manufacturing, injection molding, extruding, laser cutting, and/or other techniques. The installation tool 300 can be monolithic or comprise multiple portions that are joined together. The installation tool 300 can be made of metal (steel, aluminum, etc.), metal alloys, polymers, composites, and/or other suitable materials.

Figure 3A:
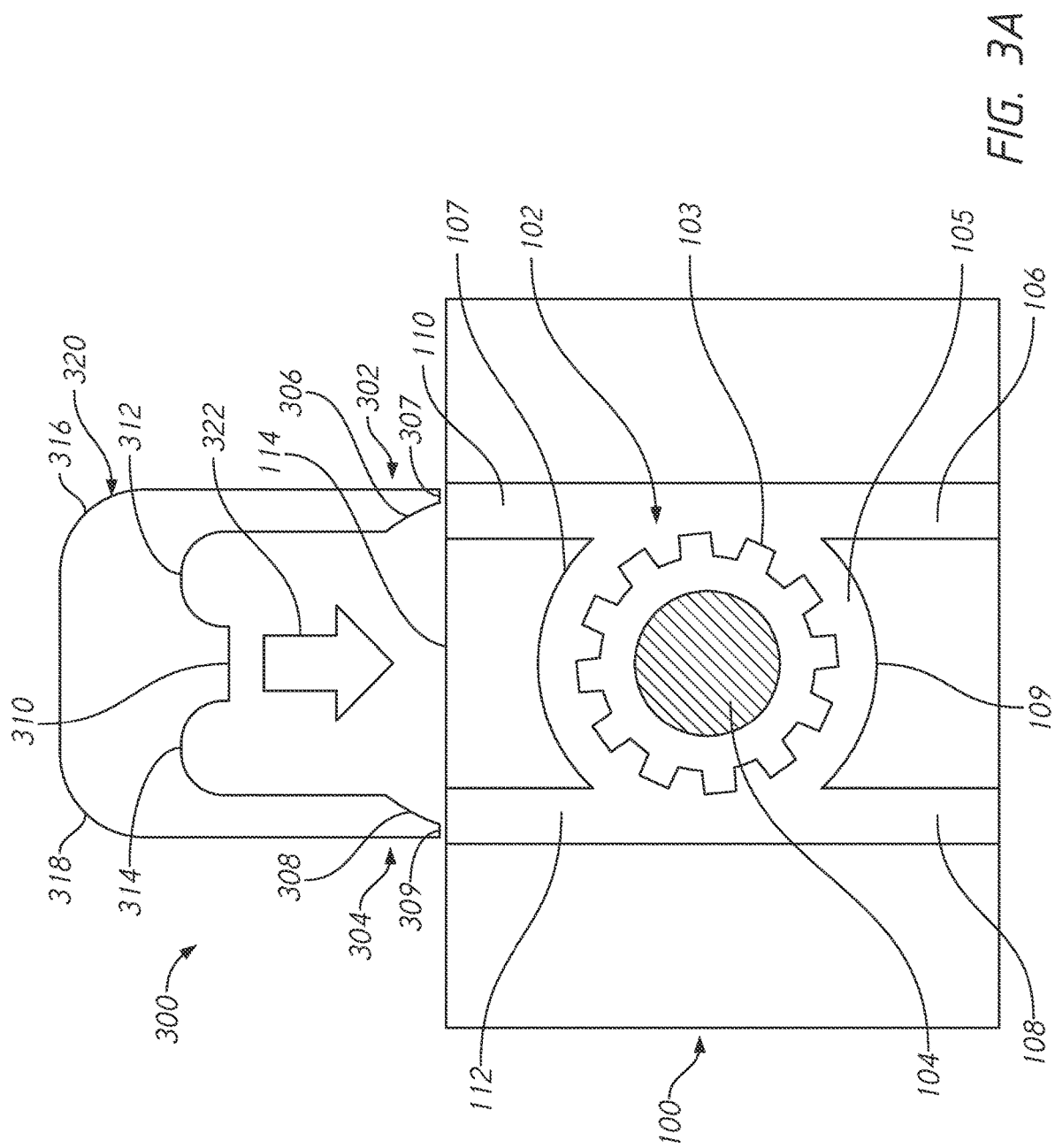
FIG. 3A illustrates the installation tool being inserted into a housing.
Figure 3B:
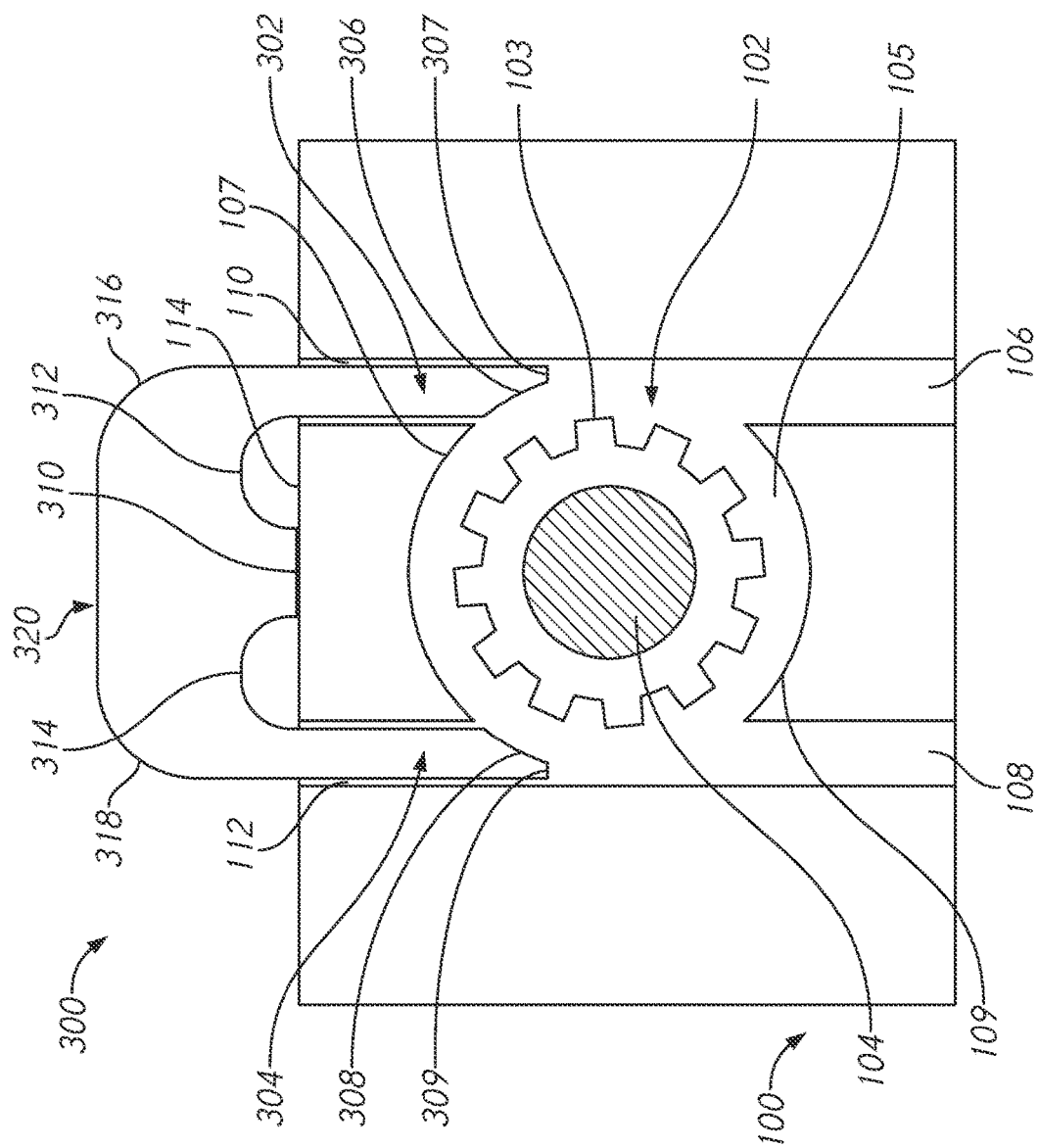
FIG. 3B illustrates the installation tool inserted into the housing.
Figure 3C:
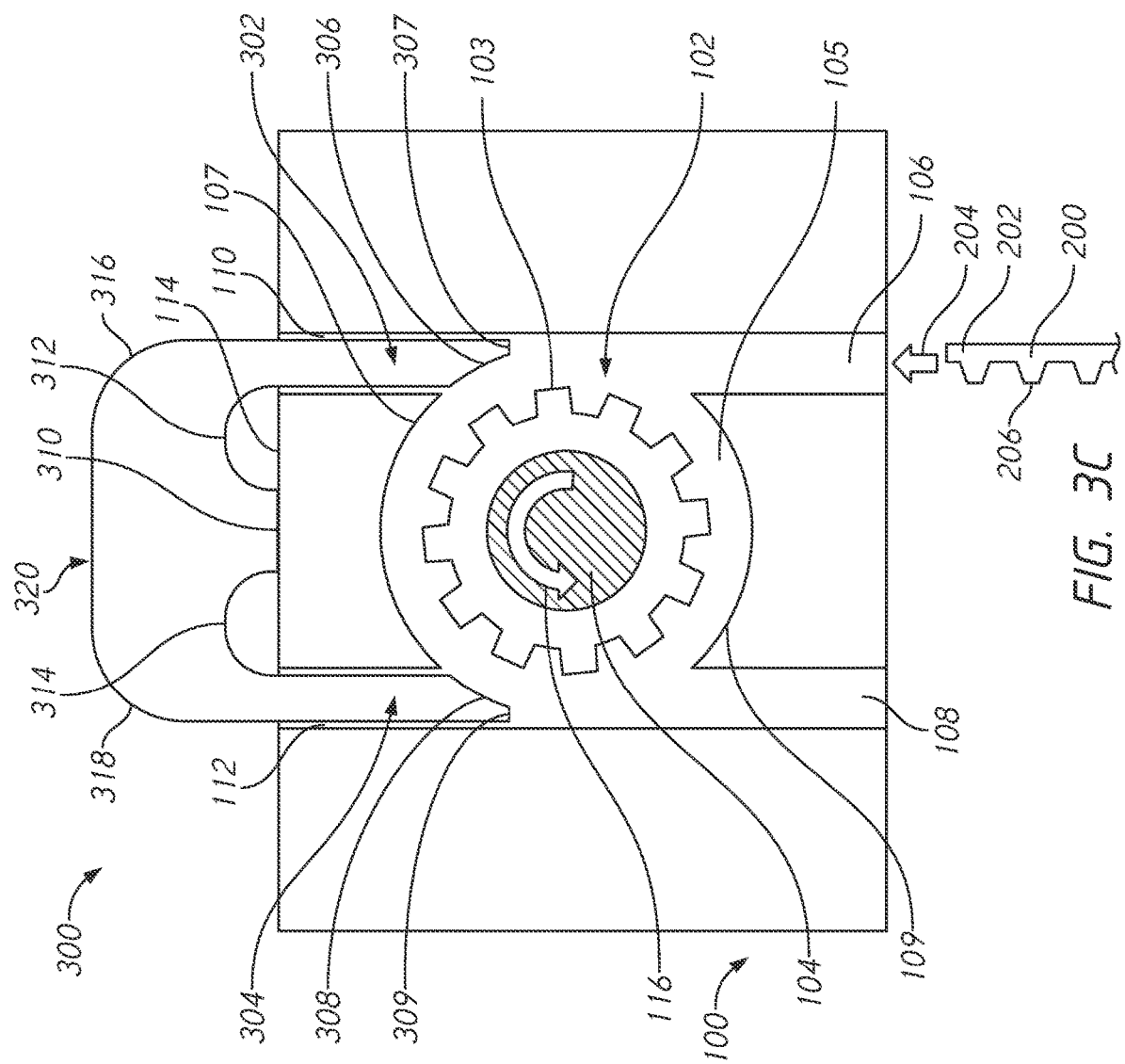
FIG. 3C illustrates a toothed belt being inserted into the housing.

FIGS. 3A-3C illustrate the installation tool 300 being used to install the toothed belt 200. As illustrated in FIG. 3A, the housing 100 can enclose the sprocket 102 within a cavity 105. The cavity 105 can have a first periphery 107 and second periphery 109. The first periphery 107 and second periphery 109 can be curved, which can include having a radius centered on the center of the sprocket 102.

As described elsewhere herein, the first arm 302 can be aligned with the first opening 110 and the second arm 304 can be aligned with the second opening 112, as shown in FIG. 3A. For example, the first arm 302 can be positioned such that a center longitudinal axis of the first arm 302 is substantially coaxial with a center axis of the first opening 110 and the second arm 302 can be positioned such that a center longitudinal axis of the second arm 304 is substantially coaxial with a center axis of the second opening 112. The installation tool 300 can be advanced in the direction of arrow 322 such that the first arm 302 is inserted into the first opening 110 and the second arm 304 is inserted into the second opening 112.

The installation tool 300 can be advanced in the direction of arrow 322 until the stop 310 contacts a surface 114 of the housing 100, as shown in FIG. 3B, placing the installation tool 300 in the inserted position. The surface 114 can be positioned between the first opening 110 and the second opening 112. In some embodiments, the surface 114 can be flat. In some embodiments, the surface 114 is not positioned between the first opening 110 and the second opening 112. The surface 114 can be configured to contact the stop 310 when the installation tool 300 is inserted into the housing 100. The surface 114 can impede movement of the installation tool 300 in the direction of arrow 322 such that the first arm 302 and second arm 304 extend to a suitable depth within the first opening 110 and second opening 112, respectively. In the inserted position, the first engagement surface 306 can prevent the toothed belt 200 from being inserted into the first opening 110 and the second engagement surface 308 can prevent the toothed belt 200 from being inserted into the second opening 112. As illustrated, the first engagement surface 306 and second engagement surface 308 can have a curvature that is the same as or similar to the first periphery 107. In some embodiments, the first engagement surface 306 and second engagement surface 308 can have a curvature that is larger or smaller than the first periphery 107. In some embodiments, the first engagement surface 306 and second engagement surface 308 can be a continuation of the first periphery 107 when the installation tool 300 is in the inserted position and the stop 310 contacts the surface 114 of the housing 100.

With the installation tool 300 in the inserted position, the end 202 of the toothed belt 200 can be inserted into the first channel 106 for installation, as shown in FIG. 3C. The toothed belt 200 can be advanced in the direction of arrow 204 while the shaft 104 is rotated (e.g., slowly rotated) in the direction of arrow 116, causing the sprocket 102 to also rotate in the direction of arrow 116. Teeth 103 of the sprocket 102 can engage with teeth 206 of the toothed belt 200 as the toothed belt 200 is advanced, which can pull the toothed belt 200 through the housing 100 and direct the end 202 of the toothed belt 200 toward the second channel 108. The toothed belt 200 may not readily be directed around the sprocket 102 and through the portion of the cavity 105 between the sprocket 102 and first periphery 107 upon extending through the first channel 106. For example, the end 202 of the toothed belt 200 may advance toward the first opening 110 which is blocked by the first engagement surface 306 before being moved around the sprocket 102. In some embodiments, the toothed belt 200 may be engaged by the sprocket 102 but end 202 may still advance toward the first engagement surface 306. Accordingly, the end 202 of the toothed belt 200 may contact the first engagement surface 306 which can deflect the end 202 toward the sprocket 102 and/or toward the portion of the cavity 105 between the sprocket 102 and the first periphery 107. The teeth 103 of the sprocket 102 can then engage with the teeth 206 of the toothed belt 200 as the belt 200 moves around the sprocket 102 between the sprocket 102 and the first periphery 107.

The end 202 of the toothed belt 200 can then advance toward the second opening 112 which is blocked by the second engagement surface 308. The end 202 of the toothed belt 200 may contact the second engagement surface 308 which can deflect the end 202 toward the second channel 108. The rotation of the sprocket 102 can continue to advance the toothed belt 200 toward the second channel 108 until the end 202 of the toothed belt 200 exits the housing 100 via the second channel 108. In some embodiments, the toothed belt 200 can be moved into the first channel 106 by being pushed into the first channel 106. The toothed belt 200 can continue to be pushed into the housing 100 from outside the housing 100. As the end 202 impacts the first engagement surface 307, the end 202 is directed toward the first periphery 107, and around the sprocket 102 in a curve. The end 202 then impinges on the second engagement surface 309, and is directed further around the sprocket 102, and toward the second channel 108. The toothed belt 200 can continue to be pushed through the housing 100 until the end 202 emerges from the second channel 108. Upon successful installation of the toothed belt 200, the installation tool 300 can be removed. The installation tool 300 can improve the efficiency of belt replacement and can reduce the down time of the processing equipment for maintenance. In some embodiments, using the installation tool 300 can enable the user to install the toothed belt 200 in three minutes or less.

In some embodiments, the installation tool 300 can be colored and/or patterned to enable the user to quickly locate the installation tool 300. In some embodiments, the installation tool 300 can include a rod, flag, and/or other feature to enable the user to quickly locate the installation tool 300. The rod, flag, or other feature can extend from the installation tool 300 such that it would be readily visible when the tool in installed in the housing 100 such that an operator or maintenance personnel would be alerted to its presence and would not attempt to start a machine or equipment with the installation tool 300 still inserted.

Figure 4:
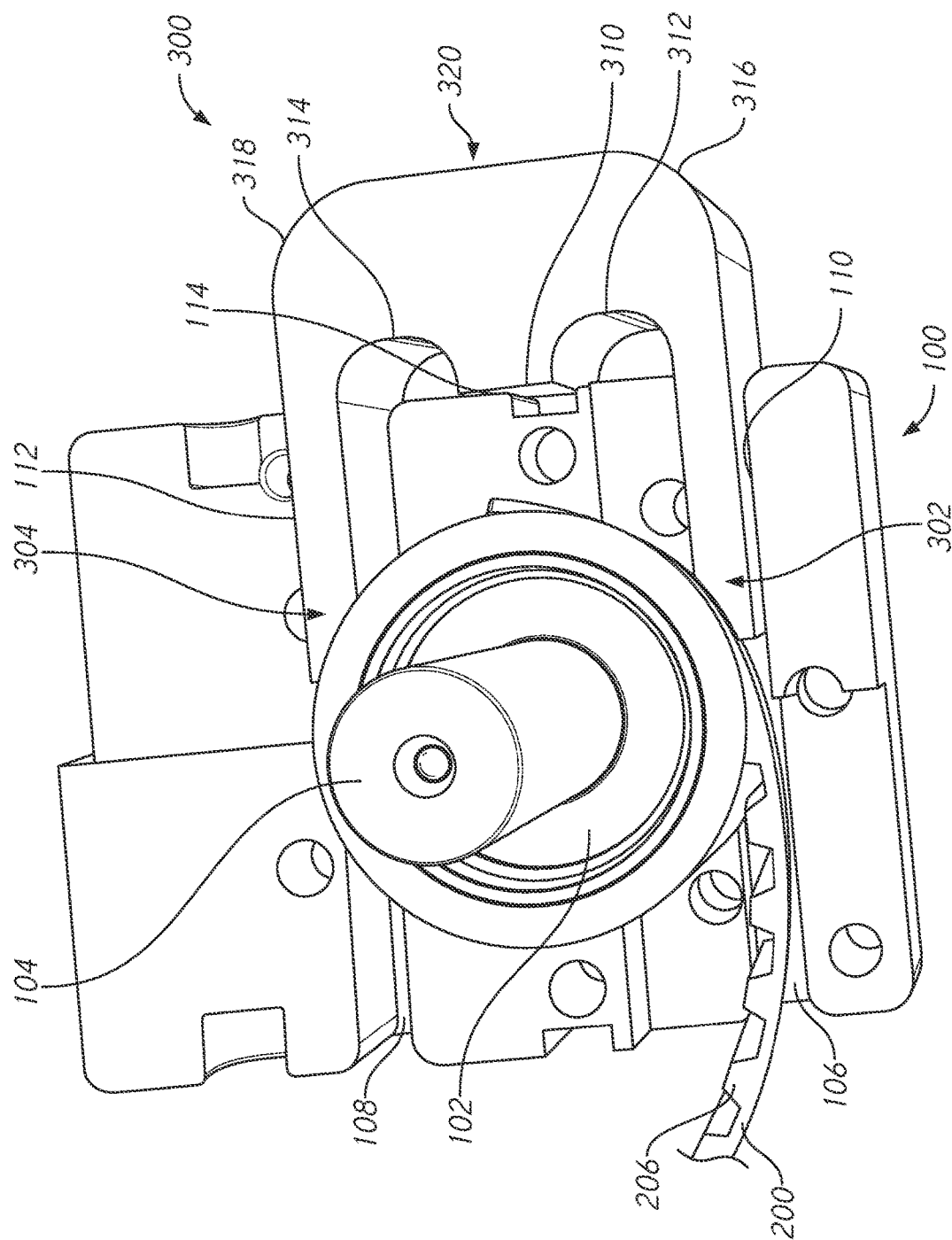
FIG. 4 illustrates a toothed belt being inserted into the housing.

FIG. 4 illustrates the installation tool 300 being used to install the toothed belt 200. Unlike in FIG. 1, the toothed belt 200 does not extend into the first opening 110, but instead, the first engagement surface 306 of the first arm 302 has prevented insertion into the first opening 110. Accordingly, the toothed belt 200 has been engaged by the sprocket 102 and is being pulled around the sprocket 102 toward the second engagement surface 308 of the second arm 304 and/or the second channel 108.

Figure 5B:
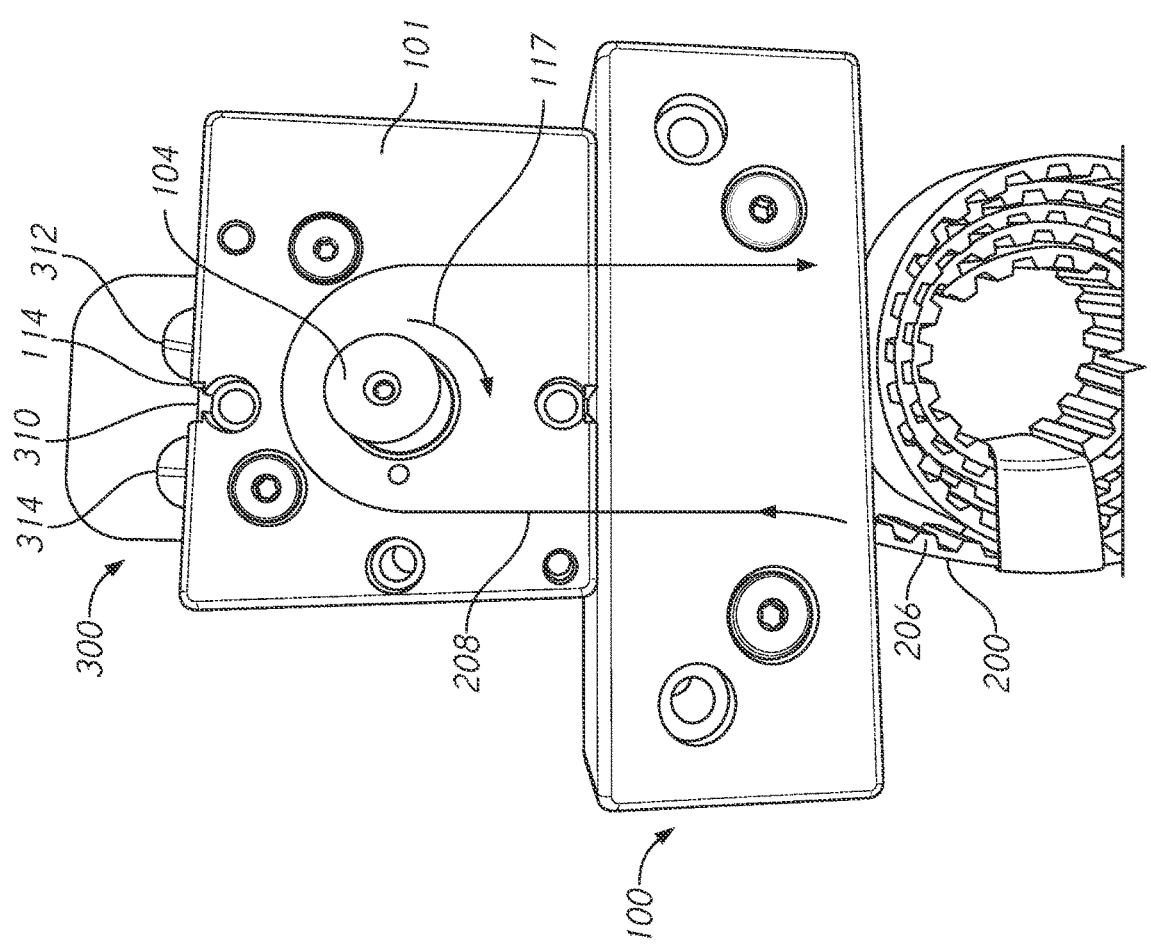
FIG. 5B illustrates a toothed belt being inserted into the housing with the cover.

FIGS. 5A-5B illustrate the installation tool 300 being used to install the toothed belt 200 as described herein with the housing 100 assembled (e.g., without removing a cover), which can advantageously enable the user to quickly install the toothed belt 200. FIG. 5A illustrates the housing 100 with a cover 101 enclosing the sprocket 102 that is coupled to the shaft 104 extending out of the housing 100. The installation tool 300 is oriented with the first arm 302 positioned to be inserted into the first opening 110 and the second arm 304 positioned to be inserted into the second opening 112, as described herein. The first arm 302 can be inserted into the first opening 110 and the second arm 304 inserted into the second opening 112 until the stop 310 contacts the surface 114 of the housing 100 to prevent advancement, as shown in FIG. 5B. The inserted installation tool 300 can prevent the toothed belt 200 from erroneously extending into the first opening 110 or second opening 112 during installation as described elsewhere herein.

The end 202 of the toothed belt 200 can be advanced into the second channel 108 to begin installation. In some embodiments, the end 202 of the toothed belt 200 can be advanced into the first channel 106 to begin installation, as described herein. The sprocket 102 can be rotated via the shaft 104 which, upon engaging the teeth 103 of the sprocket 102 with the teeth 206 of the toothed belt 200, can pull the toothed belt 200 through the housing 100. As illustrated, the shaft 104 and sprocket 102 can rotate (e.g., slowly rotate) in the direction of arrow 117, which is opposite the direction of arrow 116 described in reference to FIG. 3C, to drive the toothed belt 200 into the housing 100 through the second channel 108 and out the housing 100 via the first channel 106. The general route of the toothed belt 200 through the housing 100 is represented by the route 208.

The end 202 of the toothed belt 200 can contact the second engagement surface 308 of the second arm 304 to prevent the toothed belt 200 from entering the second opening 112 and/or deflect the end 202 toward the sprocket 102. The end 202 of the toothed belt 200 can contact the first engagement surface 306 of the first arm 302 to prevent the toothed belt 200 from entering the first opening 110 and/or deflect the end 202 toward the first channel 106 to exit the housing 100. Upon successful installation of the toothed belt 200 (e.g., the toothed belt 200 is arranged along the route 208), the installation tool 300 can be removed.

Figure 6A:
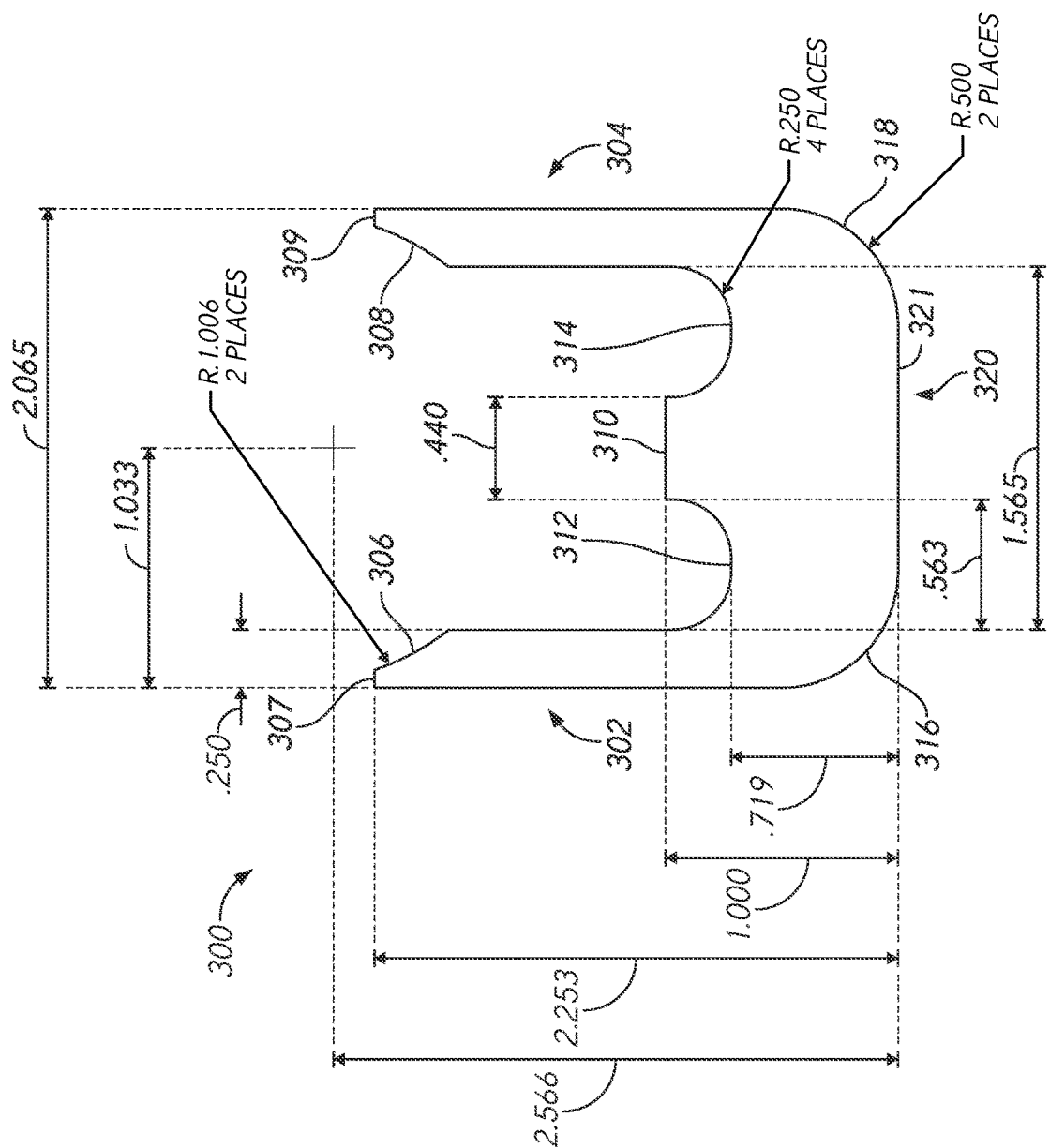
FIGS. 6A and 6B illustrate the installation tool with example dimensions.
Figure 6B:
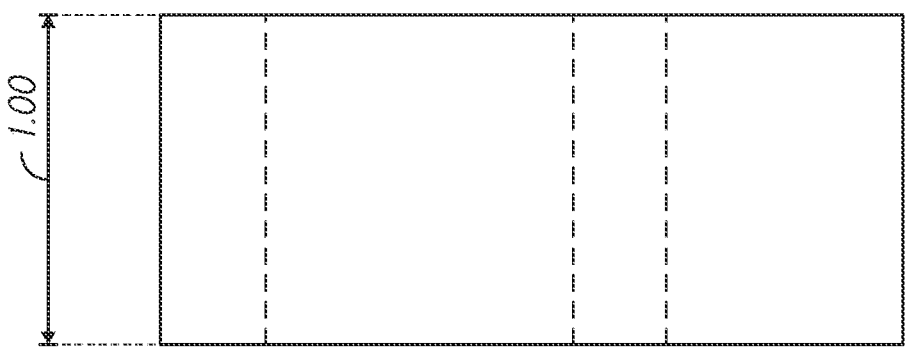

FIGS. 6A and 6B illustrate example dimensions of the installation tool 300. The installation tool 300 and its various feature(s) can be sized and configured to be compatible with different sizes and configurations of housings 100. Accordingly, the dimensions provided herein are merely exemplary but not limiting.

As illustrated in FIG. 6A, the distance between the outside surfaces of the first arm 302 and second arm 304 can be 2.065 inches. The distance between the inside surfaces of the first arm 302 and second arm 304 can be 1.565 inches. The distances between the outside surface and inside surface (e.g., the thickness) of the first arm 302 and second arm 304 can each respectively be 0.250 inches. The distance between the inside surface of the first arm 302 and stop 310 can be 0.563 inches, which can be spanned by the first contoured portion 312. The distance between the inside surface of the second arm 304 and stop 310 can be 0.563 inches, which can be spanned by the second contoured portion 314. The first contoured portion 312 can comprise two curves, each having a radius of 0.250 inches, that are separated by a flat portion. The second contoured portion 314 can comprise two curves, each having a radius of 0.250 inches, that are separated by a flat portion. The stop 310 can have a width of 0.440 inches. The first contoured portion 312 and second contoured portion 314 can be separated by 0.440 inches.

The distance between the first contoured portion 312 and the surface 321 of the main body 320 can be 0.719 inches. The distance between the second contoured portion 314 and the surface 321 of the main body 320 can be 0.719 inches. The distance between the stop 310 and the surface 321 of the main body 320 can be 1 inch. The distance between the first end 307 and the surface 321 of the main body 320 can be 2.253 inches. The distance between the second end 309 and the surface 321 of the main body 320 can be 2.253 inches. The first engagement surface 306 and second engagement surface 308 can each have a radius of 1.006 inches. The first engagement surface 306 and second engagement surface 308 can share a center of curvature. The center of curvature of the first engagement surface 306 can be 1.033 inches away from the outside surface of the first arm 302. The center of curvature of the second engagement surface 308 can be 1.033 inches away from the outside surface of the second arm 304. The center of curvature of the first engagement surface 306 and second engagement surface 308 can be 2.566 inches away from the surface 321 of the main body 320. The radius of the first fillet 316 and second fillet 318 can be 0.500 inches. As illustrated in FIG. 6B, the installation tool 300 can have a thickness of 1 inch. It will be understood that the dimensions of the installation tool 300 can be adjusted based on the dimensions or shape of the housing 100 with which the installation tool 300 is to be used.

Figure 7:
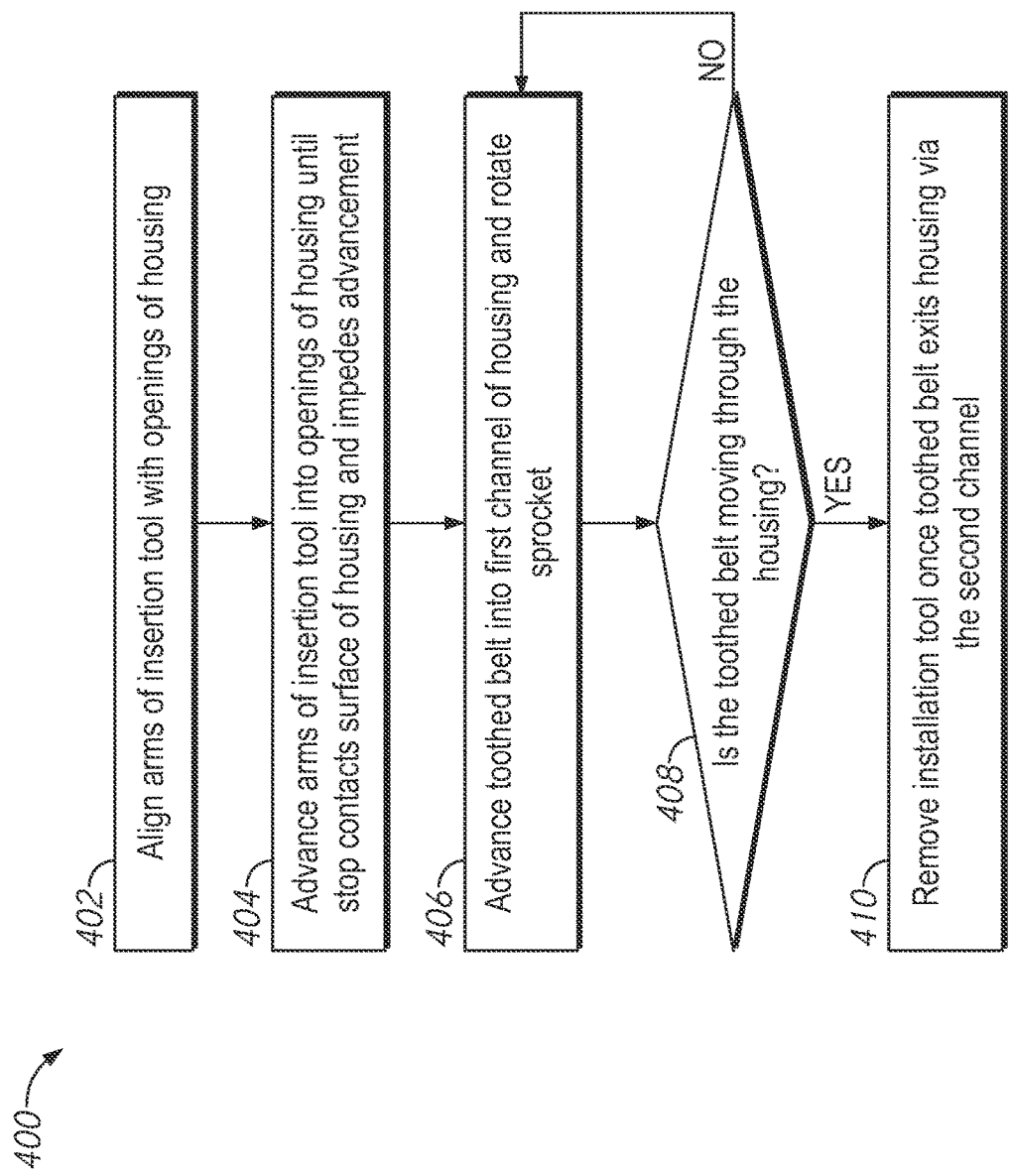
FIG. 7 illustrates a method of installing a toothed belt using the installation tool.

FIG. 7 is a flow diagram depicting an exemplary method of using the installation tool 300 to install a toothed belt 200. The flow diagram is provided for the purpose of facilitating description of aspects of some embodiments. The diagram does not attempt to illustrate all aspects of the disclosure and should not be considered limiting.

The process 400 begins at block 402. At block 402, the first arm 302 and second arm 304 of the insertion tool 300 are respectively aligned with the first opening 110 and second opening 112. As described elsewhere herein, the center longitudinal axis of the first arm 302 can be oriented to be coaxial with the center axis of the first opening 110 and the center longitudinal axis of the second arm 304 can be oriented to be coaxial with the center axis of the second opening 110.

At block 404, the first arm 302 can be advanced into the first opening 110 and the second arm 304 can be advanced into the second opening 112. The first arm 302 and second arm 304 can be advanced until the stop 310 contacts a surface 114 of the housing 100 to impede advancement. As described herein, in some embodiments, the first arm 302 can be aligned with and advanced into the second opening 112 and the second arm 304 can be aligned with and advanced into the first opening 110. With the first arm 302 and second arm 304 inserted and stop 310 contacting the surface 114, the installation tool 300 is in the inserted position.

At block 406, the end 202 of the toothed belt 200 is advanced into the first channel 106 and the sprocket 102 is rotated. The sprocket 102 is rotated by rotation of the shaft 104 which can be driven by a motor or, preferably, manually during installation of the toothed belt 200. The shaft 104 and sprocket 102 can be rotated in the direction of arrow 116, as described in reference to FIG. 3C. In some embodiments, the shaft 104 and sprocket 102 can be rotated in the direction of arrow 117, as described in reference to FIG. 5B. The direction of rotation of the shaft 104 and sprocket 102 can depend upon which channel the end 202 of the toothed belt 200 is inserted, which can depend upon the motor configuration and/or required drive direction for the toothed belt 200. If the end 202 of the toothed belt 200 is inserted into the first channel 106, the sprocket 102 and shaft 104 can be rotated in the direction of arrow 116. If the end 202 of the toothed belt 200 is inserted into the second channel 108, the sprocket 102 and shaft 104 can be rotated in the direction of arrow 117.

At decision state 408, the user can determine if the belt 200 is moving through the housing 100. For example, this can be determined by identifying whether the sprocket 102 is turning, by either the belt 200 moving the sprocket 102 or the sprocket 102 directing, pulling, etc., the toothed belt 200 through the housing 100. For example, the teeth 103 of the sprocket 102 can engage with the teeth 206 of the toothed belt 200 to drive the toothed belt through the housing 100. The user can determine if the sprocket 102 is driving the toothed belt 200 through the housing 100 when the toothed belt 200 is being pulled into the housing 100. If the toothed belt 200 is not being moved through the housing 100, the process 400 proceeds to block 406 and the user can continue to advance the toothed belt 200 through the first channel 106 and rotate the sprocket 102. In some embodiments, the user may retract the end 202 of the toothed belt 200 and re-advance the end 202 of the toothed belt 200 into the first channel 106. If the toothed belt 200 is being moved through the housing 100, the user can remove the installation tool 300 once the end 202 of the toothed belt 200 exits the housing 100 via the second channel 108. As described herein, the first engagement surface 306 and second engagement surface 308 can prevent the end 202 of the toothed belt 200 from entering the first opening 110 and second opening 112. The first engagement surface 306 and second engagement surface 308 can guide the end 202 of the toothed belt 200 through the housing 100, as described elsewhere herein, for proper installation of the toothed belt 200.

Although this disclosure has been described in the context of certain embodiments and examples, it will be understood by those skilled in the art, after reviewing the disclosure, that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art, after reviewing the disclosure. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art, after reviewing the disclosure, will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art, after reviewing the disclosure, will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Instructions refer to computer-implemented steps for processing information in the system.

Instructions can be implemented in software, firmware or hardware and include any type of programmed step undertaken by components of the system.

As can be appreciated by one of ordinary skill in the art, after reviewing the disclosure, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art, after reviewing the disclosure, will understand that the functions and operations of the electrical, electronic, and computer components described herein can be carried out automatically according to interactions between components without the need for user interaction.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An installation tool for installing a toothed belt, the installation tool comprising:
   a main body;
   a first arm extending away from the main body, the first arm comprising a first engagement surface;
   a second arm extending away from the main body, the second arm comprising a second engagement surface; and
   a stop positioned between the first and second arms;
   wherein the first arm is configured to be inserted into a first opening of a housing and the second arm is configured to be inserted into a second opening of a housing; and
   wherein the stop is configured to contact a surface of the housing to stop advancement of the first arm within the first opening and the second arm within the second opening such that the first engagement surface and second engagement surface are positioned at depths within the first opening and second opening to guide a toothed belt inserted into the housing.

2. The installation tool of claim 1, wherein the first and second engagement surfaces are curved.

3. The installation tool of claim 1, wherein the first engagement surface and the second engagement surface face each other.

4. The installation tool of claim 1, wherein the first and second arms are positioned at depths within the first and second openings to prevent a toothed belt inserted into the housing from extending into the first or second opening.

5. The installation tool of claim 1, comprising a first contoured portion extending between the first arm and the stop and a second contoured portion extending between the second arm and the stop.

6. The installation tool of claim 5, wherein the first contoured portion and second contoured portion each comprise two opposing curves.

7. The installation tool of claim 1, wherein the first arm and second arm are on opposing sides of the main body.

8. The installation tool of claim 1, wherein the first engagement surface and second engagement surface are shaped to direct the toothed belt toward a sprocket within the housing during installation of the toothed belt.

9. The installation tool of claim 1, wherein the first engagement surface is disposed on an inside surface of the first arm and the second engagement surface is disposed on an inside surface of the second arm.

10. The installation tool of claim 1, wherein the first engagement surface is disposed at an end portion of the first arm and the second engagement surface is disposed at an end portion of the second arm.

11. The installation tool of claim 1, wherein the first arm further comprises a flat end and the second arm further comprises a flat end.

12. The installation tool of claim 1, wherein the installation tool is made of aluminum.

13. An installation tool for installing a toothed belt, the installation tool comprising:
    a grasping portion;
    a first arm extending away from the grasping portion, the first arm comprising a first curved surface;
    a second arm extending away from the grasping portion, the second arm comprising a second curved surface; and
    a stop positioned between the first and second arms;
    wherein the first arm is configured to be inserted into a first opening of a housing and the second arm is configured to be inserted into a second opening of the housing; and
    wherein the stop is configured to contact the housing to position the first arm into the first opening and the second arm into the second opening at depths such that the first curved surface and second curved surface are radially offset from a sprocket housed within the housing, wherein the first curved surface and/or second curved surface are configured to guide an end of a toothed belt inserted into the housing for installation around the sprocket.

14. The installation tool of claim 13, wherein the first and second curved surfaces are configured to impede the toothed belt from being inserted into the first opening and second opening.

15. The installation tool of claim 13, wherein the first arm is in a mirrored configuration relative to the second arm.

16. The installation tool of any of claim 13, wherein the stop is disposed between the first arm and the second arm.

17. The installation tool of any of claim 13, wherein the first curved surface is disposed at an end portion of the first arm and the second curved surface is disposed at an end portion of the second arm.

18. A method of installing a toothed belt on a sprocket within a housing, the method comprising:
    aligning a first arm of an insertion tool with a first opening of a housing;
    aligning a second arm of the insertion tool with a second opening of the housing;
    advancing the first arm into the first opening and the second arm into the second opening until a stop of the insertion tool contacts the housing to prevent further advancement such that a first engagement surface of the first arm blocks access to the first opening from within the housing and a second engagement surface of the second arm blocks access to the second opening from within the housing;

advancing an end of a toothed belt into a first channel of the housing; and rotating a sprocket disposed within the housing until the sprocket engages and drives the toothed belt through the housing and out a second channel of the housing.

19. The method of claim 18, further comprising deflecting the end of the toothed belt off the first engagement surface and toward the sprocket.

20. The method of claim 18, wherein aligning the first arm of the insertion tool with the first opening of the housing comprises orienting a center longitudinal axis of the first arm to be coaxial with a center axis of the first opening and aligning the second arm of the insertion tool with the second opening of the housing comprises orienting a center longitudinal axis of the second arm to be coaxial with a center axis of the second opening.

\* \* \* \* \*